Feb. 5, 1952 — J. C. LISBON ET AL — 2,584,276
METHOD OF MAKING SLIP LASTED SHOES
Filed Dec. 4, 1947 — 7 Sheets-Sheet 1

Inventors
Joseph C. Lisbon
Horatio S. Lyness
By their Attorney

Feb. 5, 1952        J. C. LISBON ET AL        2,584,276
METHOD OF MAKING SLIP LASTED SHOES
Filed Dec. 4, 1947        7 Sheets-Sheet 2

Inventors
Joseph C. Lisbon
Horatio S. Lyness
By their Attorney

Feb. 5, 1952   J. C. LISBON ET AL   2,584,276
METHOD OF MAKING SLIP LASTED SHOES
Filed Dec. 4, 1947   7 Sheets-Sheet 3

Inventors
Joseph C. Lisbon
Horatio S. Lyness
By their Attorney

Feb. 5, 1952   J. C. LISBON ET AL   2,584,276
METHOD OF MAKING SLIP LASTED SHOES
Filed Dec. 4, 1947   7 Sheets-Sheet 5

Inventors
Joseph C. Lisbon
Horatio S. Lyness
By their Attorney

Feb. 5, 1952  J. C. LISBON ET AL  2,584,276
METHOD OF MAKING SLIP LASTED SHOES
Filed Dec. 4, 1947  7 Sheets-Sheet 6

*Inventors*
Joseph C. Lisbon
Horatio S. Lyness
By their Attorney

Feb. 5, 1952 J. C. LISBON ET AL 2,584,276
METHOD OF MAKING SLIP LASTED SHOES
Filed Dec. 4, 1947 7 Sheets-Sheet 7

Inventors
Joseph C. Lisbon
Horatio S. Lyness
By their Attorney

Patented Feb. 5, 1952

2,584,276

UNITED STATES PATENT OFFICE 2,584,276

METHOD OF MAKING SLIP LASTED SHOES

Joseph C. Lisbon, Haverhill, and Horatio S. Lyness, Lynn, Mass., assignors to United Shoe Machinery Corporation, Flemington, N. J., a corporation of New Jersey Application December 4, 1947, Serial No. 789,642

16 Claims. (Cl. 12—142)

This invention relates to methods of making shoes and, more particularly, to slip-lasted platform shoes having closed heel ends and stiff back parts or counter portions.

In shoes of the type referred to, a prefitted upper, a flexible insole or sock lining and a platform cover or wrapper strip are usually assembled and stitched together while off a last to form an upper assembly and a last is then inserted into the upper to slip-last the shoe. In order to stitch the parts together properly the upper, sock lining and wrapper strip must be in a soft flexible condition to permit the needle to penetrate the work.

Shoes of this type are usually open toe and heel shoes having an opening for the foot at the front end of the vamp and merely a strap or no upper at all at the heel portion of the shoe. Consequently, no problem arises in such shoes with respect to the stitching operation referred to because the upper is flexible throughout the portions which are to be stitched to the sock lining and platform cover or wrapper strip.

It is sometimes desirable, however, especially in the better grades of slip-lasted shoes, to produce a shoe in which the upper is closed at its heel or quarter portion and is composed of stiff material molded to the shape of the last in the same manner as shoes made on a last, such as welt, McKay or compo shoes. Since the upper must be soft and flexible at its closed heel portion to permit it to be stitched to the sock lining, it will be clear that a premolded counter composed of stiff fibrous material cannot be assembled in the upper between its lining and outer layer, as in other types of shoes, before the parts are stitched together because the counter would interfere with the stitching operation. Moreover, in the usual types of platform shoes, a stiff molded counter cannot be introduced into the upper after the upper has been stitched to the sock lining, because there is then no opening between the upper and lining for receiving such counter and the counter cannot be located inwardly of the lining in the finished shoe. Although a flexible counter composed of thermoplastic material is sometimes assembled with the upper and stitched to the sock lining off a last, after which the shoe is slip-lasted and the thermoplastic counter activated to produce a stiff back part, this procedure usually involves considerable extra labor and expense and is therefore not practicable in this type of shoe.

An important object of the present invention is to provide an improved method of making shoes of the type referred to having closed heel portions and stiff molded back parts or counter portions in the practice of which the difficulties pointed out above are eliminated.

To the accomplishment of this object, the invention provides, in accordance with one aspect, an improved method of making shoes in which an upper having a closed heel portion is stitched to a sock lining and wrapper strip off a last and a last is inserted into the upper to slip-last the shoe. A back part unit is then provided which includes a molded counter and this unit is mounted over the heel portion of the upper and secured thereto, thereby providing the shoe with a stiff molded heel or counter portion located outside the upper. Shoe bottom members are attached to the bottom of the shoe to complete its construction, these bottom members including an outer or tread sole and, if desired, additional sole members and a heel, depending upon the particular type of shoe desired.

As herein illustrated, the upper having a closed heel portion, a sock lining and a wrapper strip are secured together off a last by stitches extending around the lower margin of the upper. A last is then inserted into the upper to slip-last the shoe. The back part unit, in accordance with one aspect of the invention, comprises a molded and flanged counter, a heel tuck and a rear part wrapper strip, the wrapper strip being secured to the lower edge of a quarter which, in turn, is secured to the outer surface of the counter. The heel tuck, which is usually of fiber, is preferably secured to the flange of the counter to hold the latter in shape, thereby completing one form of back part unit which may be used in the present shoe. As stated, the back part unit is mounted over the heel portion of the upper and is secured thereto preferably by cement. A platform sole is applied to the shoe bottom and the wrapper strips are turned and secured to the outer surface of the platform sole in accordance with the usual practice. An outsole and, if desired, a heel are attached to the shoe bottom to complete the construction of the shoe. Before the platform sole is applied, if desired, the last may be removed from the shoe and the back part unit permanently attached to the upper by stitches extending around the top edge of the quarter. The last may then be reinserted and the shoe completed as described above. The stitching of the back part unit to the upper may also, if desired, be performed after the other operations have been completed and the last has been removed from the finished shoe.

In accordance with another aspect of the invention, the back part unit may comprise a molded counter, a tuck, a rear part wrapper strip and a heel. In this construction, the platform sole will terminate at, and abut, the breast of the heel and the outsole will likewise abut the breast of the heel. Moreover, in such case, the rear part wrapper strip may be shaped to cover the heel on the unit, including the breast of the heel.

In accordance with another form of the invention, the back part unit may comprise a molded and flanged counter, a tuck, and a rear part wrapper strip but no heel, and the separate platform sole may extend the full length of the shoe bottom instead of terminating at the breast of the heel. After the wrapper strips have been turned to cover the edge face of the platform sole, a precovered wedge heel may be applied to the heel portion of the platform, after which a full length outsole may be attached which will underlie the platform sole at the forepart of the shoe and will underlie the wedge heel at the shank and heel portions thereof.

Instead of utilizing a back part unit and a separate platform sole, as described above, the back part unit may, in accordance with another aspect of the invention, include a full length platform sole and a heel. This type of unit is mounted on the heel portion of the slip-lasted upper, as explained above, and temporarily secured to the upper. The wrapper strips are turned and secured to the platform sole and heel and the last may then be removed, if desired, to permit the stitching of the top edge of the unit, that is, the quarter, to the shoe upper, after which the last may be reinserted and an outsole attached to complete the shoe, the outsole abutting the breast of the heel.

The platform sole, whether forming a part of the back part unit or comprising a separate sole may, if desired, consist of a bound platform sole, that is, one which has its edge face bound or covered by a flexible binding strip before the sole is applied to the shoe bottom or incorporated into the back part unit. When a bound platform sole is used, one or both of the wrapper strips referred to may be omitted.

With the above and other aspects and features in view, the invention will now be described in detail with reference to the accompanying drawings and will thereafter be pointed out in the claims.

Figures 1, 2, 3:
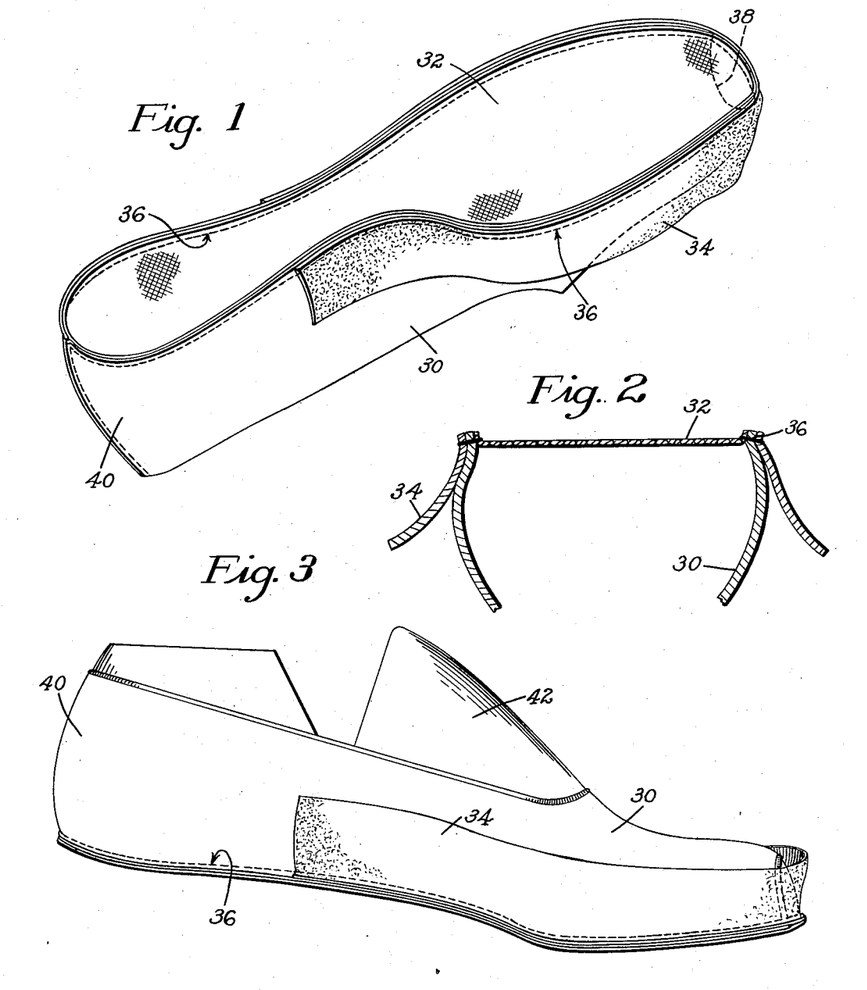
Fig. 1 is a perspective view of a shoe upper having an open toe and a closed heel portion secured off a last to a flexible insole or sock lining and a forepart wrapper strip by stitches extending around the periphery of the sock lining.
Fig. 2 is a cross sectional view through the forepart of the assembly of Fig. 1.
Fig. 3 is a side elevational view showing the assembly of Figs. 1 and 2 after a last has been inserted into the upper to slip-last the shoe.

In practicing the method of the present invention, a shoe upper 30 of leather, fabric or other suitable upper material is secured to a flexible insole or sock lining 32 off a last together with a forepart platform cover or wrapper strip 34 by stitches 36 which, as shown in Fig. 1, extend around the periphery of the sock lining, including its heel portion, thereby providing an upper assembly which may be slip-lasted by inserting a last into the upper in accordance with the usual practice of making slip-lasted shoes. As shown in Fig. 1, the upper 30 has an open toe, indicated at 38, which is common in such shoes, but it has a closed heel portion 40 or one which, when united to the sock lining, will cover the entire heel portion of the last. The stitching may be done in the usual manner on any conventional sewing machine. After the stitching operation has been performed off the last, the forepart platform cover or wrapper strip 34, as shown in Figs. 1 and 2, will extend downwardly close to the adjacent portions of the upper so that, when the upper assembly is turned right-side-up, the wrapper strip will extend upwardly closely adjacent to the upper. After the upper, sock lining and wrapper strip have been assembled and stitched together off a last, as illustrated in Figs. 1 and 2, a last 42 is inserted into the upper, as shown in Fig. 3, to slip-last the shoe, the wrapper strip 34 now extending upwardly adjacent to the upper in the manner mentioned above.

Figure 4:
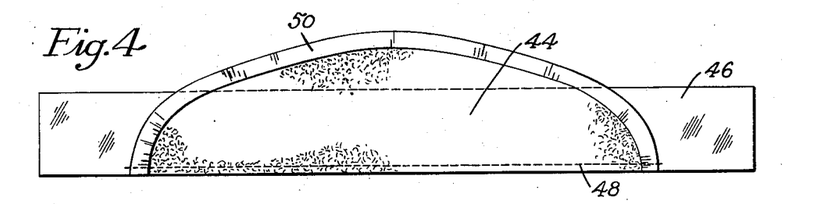
Fig. 4 is a plan view of the flesh side of an upper quarter, the top margin of which has been folded over to present a finished edge, the quarter being placed against the grain side of a forepart platform cover or wrapper strip and secured thereto by stitches extending along the lower edges of said members.

The next step in practicing the method of the present invention is to provide a complete back part unit which, together with the upper assembly described above, is to produce a platform shoe having a closed heel portion and a stiff molded back part or counter portion. To this end, a quarter 44 of flexible leather or other suitable upper material is placed upon a rear part wrapper strip 46 of leather and the two parts are secured together by stitches 48 extending along the lower edges of the parts, these edges, as shown in Fig. 4, preferably being located in substantial alinement with each other. If the quarter 44 is composed of leather, its top margin is preferably folded over as at 50 to produce a finished edge on the quarter. As illustrated, the grain surface of the quarter is placed against the grain surface of the wrapper strip 46 when the two parts are stitched together.

Figure 5:
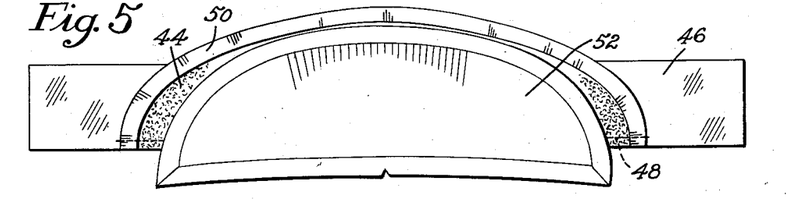
Fig. 5 shows a flat fiber counter positioned on the assembly of Fig. 4.
Figure 6:
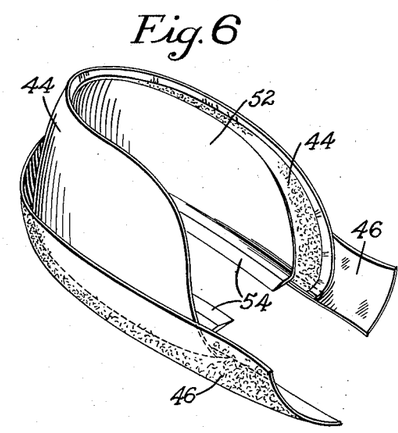
Fig. 6 is a perspective view of the assembly of Fig. 5 molded to conform it to the shape of the heel portion of a last and to provide an inwardly extending flange at the lower margin thereof.
Figure 7:
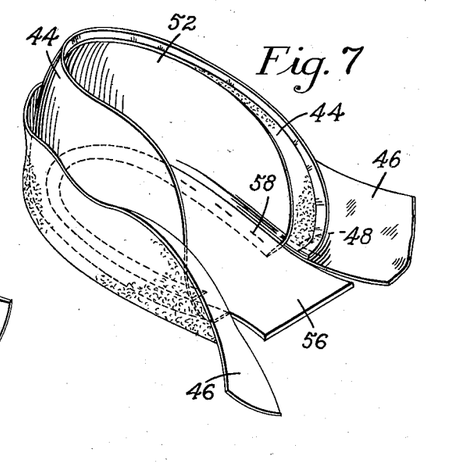
Fig. 7 is a perspective view, similar to Fig. 6, but having a fiber heel tuck secured to the inner surface of the flange to form a complete back part unit.

A flat unmolded counter 52, preferably composed of stiff fiber, is now positioned on the assembled quarter and wrapper strip with cement between the counter and quarter and the cement is permitted to dry to secure the counter to the quarter. The assembly is then molded in any usual or conventional counter molding machine to conform the assembly to the shape of the heel portion of a last and to form an inwardly extending flange 54 on the lower margin of the counter 52, as illustrated in Fig. 6. After the assembly has been molded and flanged, a fiber heel tuck 56 of usual flat heel-shaped contour is positioned against the inner side of the flange 54 and secured thereto, for example, by staples 58 driven into the flange and clinched against the tuck. This produces one form of back part unit ready for assembling with the upper assembly of Fig. 3, the opposite wings of the counter 52 having been fastened in proper position by the tuck 56.

Figure 8:
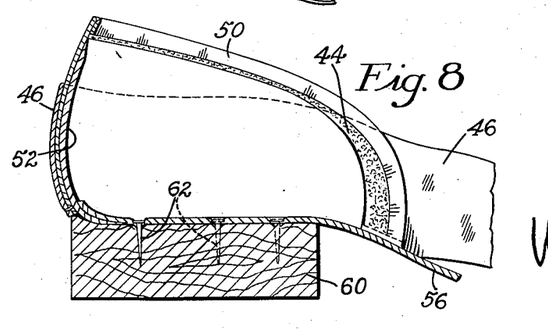
Fig. 8 is a longitudinal sectional view through the back part unit of Fig. 7 with a heel secured to its bottom surface to form another type of unit.

The back part unit of Fig. 7 is utilized in making one type of platform shoe disclosed herein which will be described more fully hereinafter. The unit of Fig. 7, however, may be further completed, as illustrated in Fig. 8, by the addition of a wood heel 60 of any desired style which may be secured to the unit by the usual heel attaching nails 62 driven through the tuck 56 and into the heel. The complete back part unit of Fig. 8, therefore, comprises a molded and inwardly flanged fiber counter, a quarter covering the outer surface of the counter, a rear part wrapper strip stitched to the lower margin of the quarter, a heel tuck secured to the flange of the counter, and a heel of any desired style permanently attached to the bottom of the unit by nails, the heel being preferably uncovered at the time of its assembly in the unit. It will be noted in Figs. 6 to 8, inclusive, that the finished edge of the quarter 44 projects some distance above the top edge of the counter 52.

Figure 9:
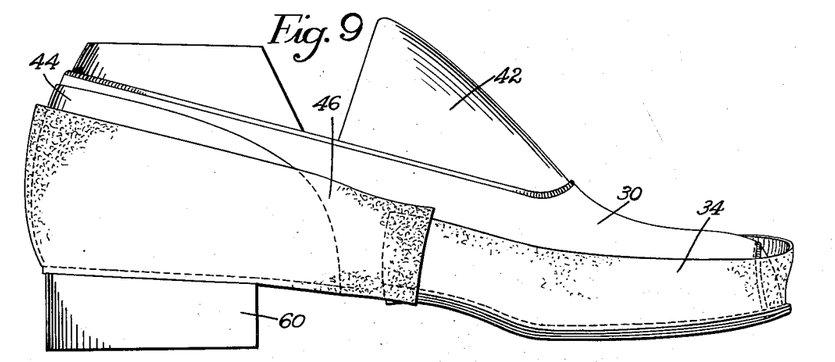
Fig. 9 is a side elevational view similar to Fig. 3 with the back part unit of Fig. 8 mounted over the heel portion of the upper.

The back part unit of Fig. 8 is now mounted over the heel portion 40 of the upper 30 of Fig. 3 to enclose the entire heel portion of the upper as shown in Fig. 9, cement being placed on the inner surface of the counter before it is mounted over the upper so that, when the cement sets, the back part unit will be held in position on the upper. As illustrated in Fig. 9, the rear part wrapper strip 46 will extend upwardly against the quarter 44 and will overlap the forepart wrapper strip 46 in the shank portion of the shoe.

Figure 10:
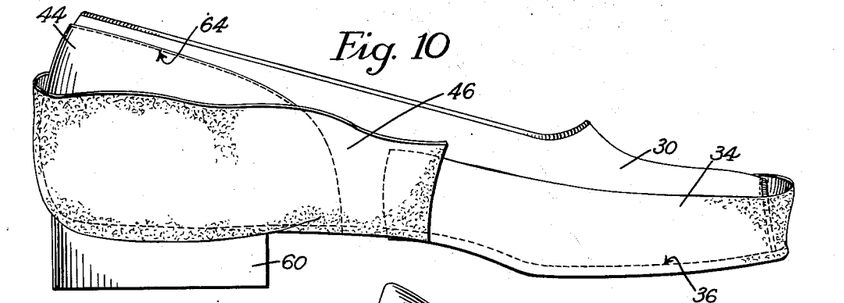
Fig. 10 shows the last removed from the shoe and the back part unit permanently attached to the upper by stitches extending around the top edge of the quarter.

The last 42 may now be removed from the shoe, as shown in Fig. 10, and the back part unit permanently secured to the upper by stitches 64 which are located in the portion of the quarter 44 which projects upwardly beyond the counter 52, the stitches extending around the top edge of the quarter and passing through only the quarter and upper.

Figures 11, 12:
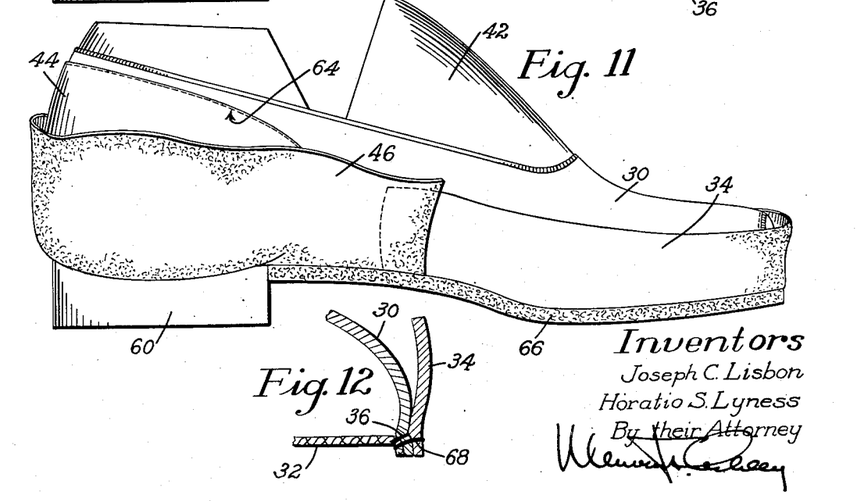
Fig. 11 illustrates the shoe of Fig. 10 after the last has been reinserted and a platform sole applied to the shoe bottom.
Fig. 12 is a fragmentary cross sectional view of a modified upper assembly in which the upper is stitched to the sock lining by one row of stitches and the forepart wrapper strip is then secured to the upper and sock lining by another row of stitches.

After the back part unit has been permanently secured to the upper by the stitches 64, the last 42 may be reinserted into the shoe, as illustrated in Fig. 11, and a platform sole 66, composed of the usual yielding material such as felt, fiber or similar materials, is applied to the shoe bottom, the platform sole having cement on its attaching surface and being of such a length that it will terminate at and abut the breast of the heel 60.

It may be pointed out here that, although the forepart wrapper strip 34 is preferably stitched to the upper and sock lining, as illustrated in Figs. 1 and 2, by a single row of stitches 36 before the last is inserted into the upper, it is nevertheless within the scope of the invention to apply the forepart wrapper strip 34 at a later stage in the method, for example, when the last is removed from the shoe, as shown in Fig. 10, to permit the back part unit to be permanently secured to the upper by the stitches 64. In such case the upper and sock lining would be secured together around the forepart and shank portions of the shoe by a single row of stitches 36, as shown in Fig. 12, and the forepart wrapper strip 34 would be secured to the upper and sock lining by another row of stitches 68. The last could then be reinserted into the shoe, as described above, and the platform sole 66 laid, the platform sole, as illustrated in Fig. 11, effectively covering the seam or seams which unite the upper, sock lining and wrapper strip.

Figure 13:
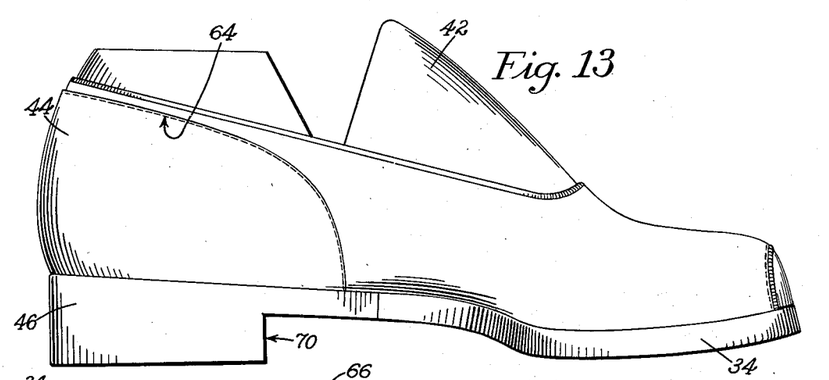
Fig. 13 shows the shoe after the wrapper strips have been turned downwardly to cover the edge faces of the heel and platform sole and then wiped inwardly beneath the bottom surfaces of said heel and sole and secured thereto.
Figures 14, 15, 16:
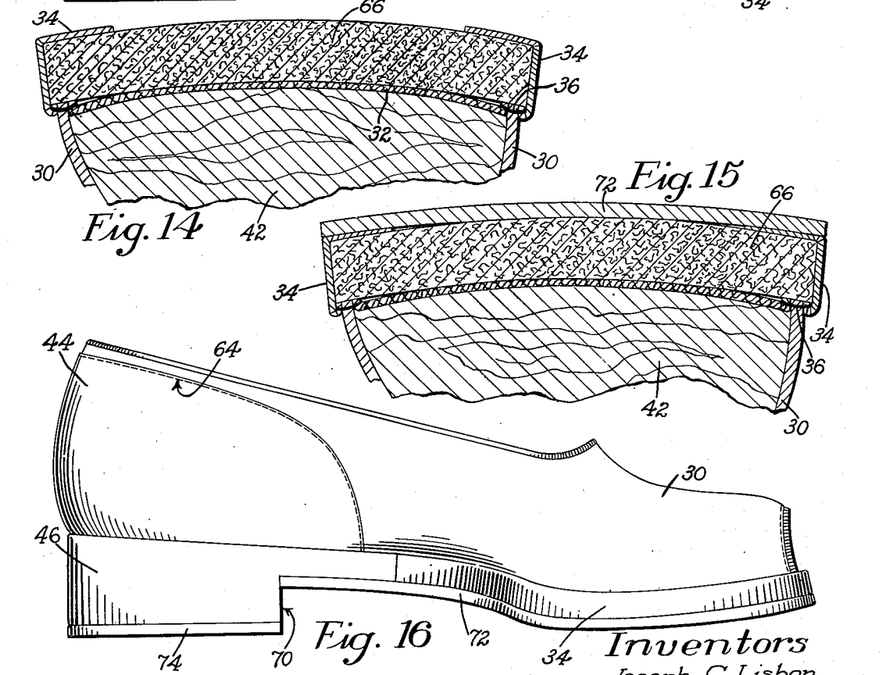
Fig. 14 is a greatly enlarged transverse sectional view through the forepart of the shoe of Fig. 13.
Fig. 15 is a sectional view similar to Fig. 14 after an outsole has been attached to the shoe bottom.
Fig. 16 is a side view of the finished shoe with the last removed.

The shoe is now ready for the final operations which are to complete the shoe, these operations being carried out in accordance with the usual practice of making slip-lasted platform shoes. As illustrated in Fig. 13, the rear part wrapper strip 46 is turned downwardly to cover the side walls of the heel 60, including the breast 70 of the heel and a portion of the edge face of the platform sole adjacent thereto, the lower margins of the wrapper strip being wiped inwardly and secured to the bottom surfaces of the heel and platform sole preferably by cement. The forepart wrapper strip 34 is likewise turned downwardly to cover the edge face of the platform sole and is wiped inwardly and secured to the bottom surface of said sole. Fig. 14 illustrates, on an enlarged scale, how the forepart of the shoe of Fig. 13 will appear in cross section and Fig. 15 illustrates the forepart of the shoe after an outsole 72 has been attached in the usual manner to the inturned portions of the wrapper strips 34 and 46 to complete the construction of the shoe, the outsole 72, as shown in Fig. 16, terminating at, or abutting, the breast 70 of the heel. A heel lift 74 may be applied to the bottom surface of the heel to complete the shoe. Fig. 16 illustrates the finished shoe after the last has been removed.

Figure 17:
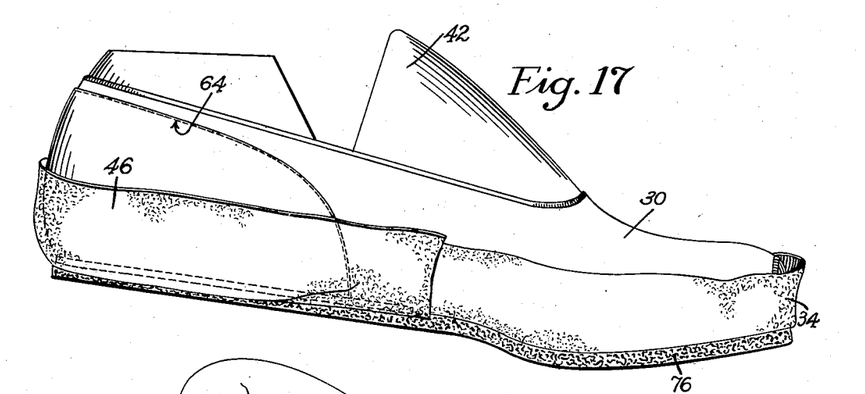
Fig. 17 is a view similar to Fig. 11 but embodying the back part unit of Fig. 7 which has no heel, the platform sole in this figure extending the full length of the shoe bottom.
Figures 18, 19:
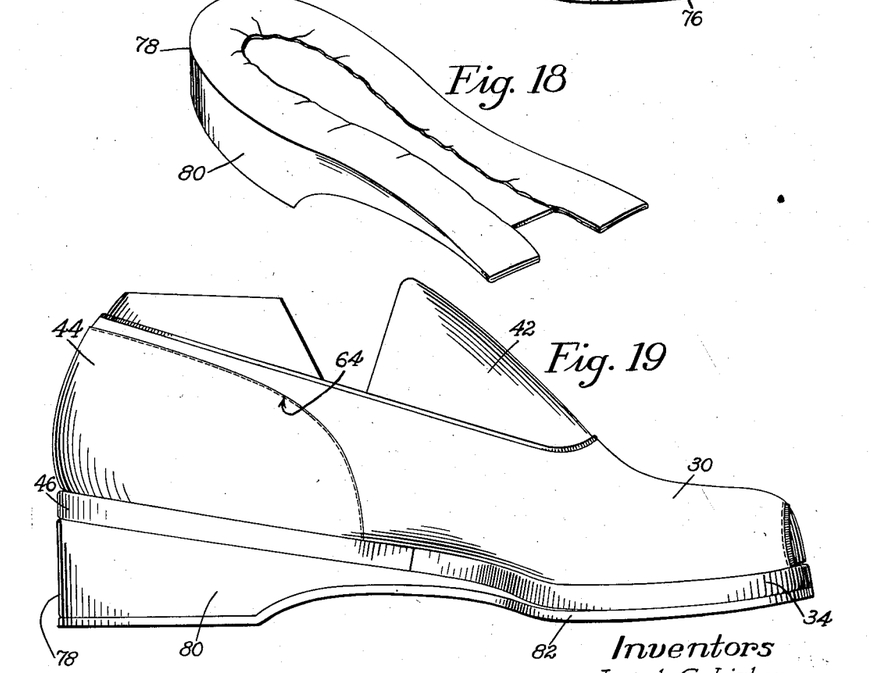
Fig. 18 is a perspective view of a covered wedge heel.
Fig. 19 shows the shoe of Fig. 17 with the wrapper strips turned, the wedge heel of Fig. 18 applied and a full length outsole attached to the shoe bottom.

As stated above, a modified form of back part unit may be utilized in making a somewhat different type of platform shoe, this unit, as illustrated in Fig. 7, comprising a molded and inwardly flanged counter 52 covered by a quarter 44, a rear part wrapper strip 46 secured by stitches to the quarter, and a heel tuck 56 secured by staples 58 to the inturned flange of the counter. As illustrated in Fig. 17, the upper 30 secured to the sock lining 32 and forepart wrapper strip 34 has the last 42 inserted therein to slip-last the shoe. The back part unit of Fig. 7 is then mounted over the heel portion of the upper with cement between the parts to cause the unit to become initially secured to the upper, after which, if desired, the last may be removed and the back part unit permanently secured to the upper by stitches 64. The last may then be reinserted and a full length platform sole 76 applied to the shoe bottom with cement on its attaching face to cause the platform sole to become attached to the shoe. The rear part wrapper strip 46 and the forepart wrapper strip 34 are turned downwardly, as described above, to cover the entire edge face of the full length platform sole, the lower margins of the wrapper strips being wiped inwardly and secured to the bottom surface of the sole. A wedge heel 78, such as that illustrated in Fig. 18, may now be provided for application to the heel and shank portions of the shoe of Fig. 17. The wedge heel may be formed with a low shallow arch at its shank and it may be precovered with leather 80 in the usual manner to give the heel a finished appearance. After the wedge heel 78 has been attached to the rear portion of the platform sole 76, a full length outsole 82 may be attached to the shoe bottom, preferably by cement, to complete the shoe. In this way a wedge heel platform shoe may be provided having its upper closed at the heel portion of the shoe, said heel portion being molded to conform to the shape of the heel portion of a last and having a stiff back part or counter portion the same as the counter portions of shoes of usual construction made on a last.

Figure 20:
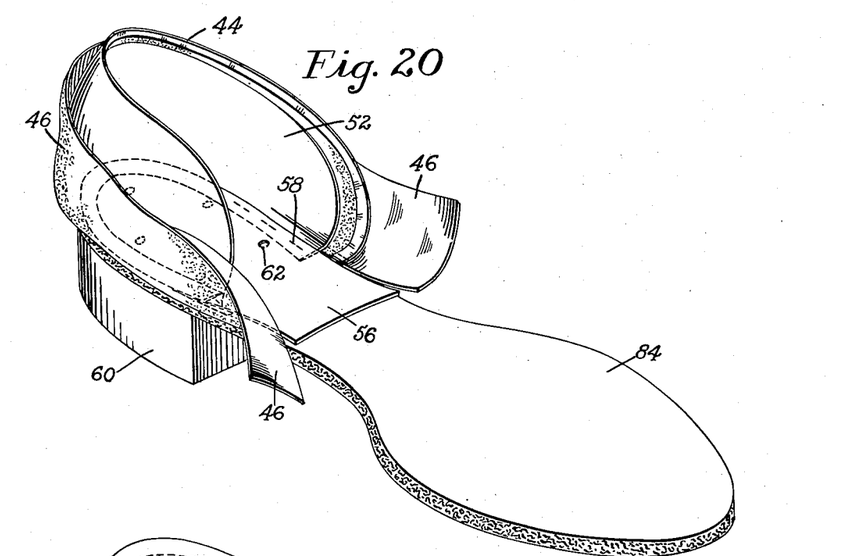
Fig. 20 is a perspective view of a back part unit similar to that of Fig. 8, but including also a full length platform sole interposed between the tuck and heel.

As another modification of the invention, the present method contemplates the provision of a back part unit such as that illustrated in Fig. 20 in which a full length platform sole is included in the unit in addition to a heel, this type of unit producing a platform shoe of the style illustrated in Fig. 16 but in which the platform sole underlies the heel portion of the foot instead of terminating at the breast of the heel as in Fig. 16. As shown in Fig. 20, this back part unit comprises the same elements as the unit of Fig. 8, including a heel 60 of any desired style but, in addition, includes a full length platform sole 84 interposed between the heel 60 and the counter 52 and heel tuck 56, the platform sole 84 being secured to the unit by the heel attaching nails 62 which hold the heel on the unit.

Figures 21, 22:
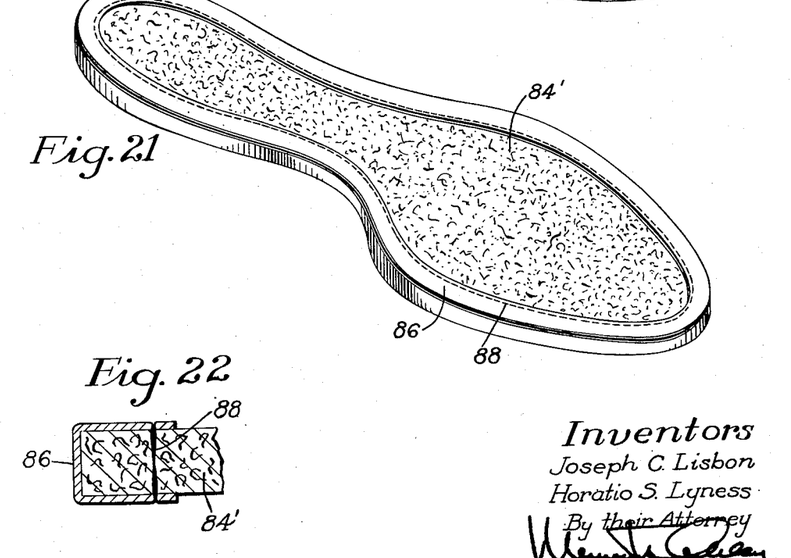
Fig. 21 is a perspective view of a precovered platform sole in which the edge face of the sole has been covered or bound with a flexible binding strip.
Fig. 22 is an enlarged transverse sectional view of one margin of the bound platform sole of Fig. 21.

If desired, the platform sole may comprise a so-called "bound" platform in which the edge face of the platform sole is precovered or bound with a flexible binding strip or wrapper in the manner illustrated in Figs. 21 and 22. As shown in the latter figures, the full-length platform sole 84' has its edge face covered around the entire periphery of the sole by a flexible binding strip or wrapper 86 which may be secured to the sole by stitches 88 extending through the sole and the opposite margins of the binding strip or, if desired, the binding strip may be attached by cement placed between said margins and the platform sole. This "bound" platform sole might also be used in the shoe illustrated in Figs. 17 to 19, inclusive, in which a full length platform sole is utilized in producing a wedge heel type of platform shoe. Where a precovered or bound platform sole is used, the forepart wrapper strip 34 and the rear part wrapper strip 46 may be dispensed with and a heel used which is precovered with leather or other suitable covering material. A rear part wrapper strip could, however, be included in the back part unit, if desired, as illustrated in Fig. 20, and used to cover an uncovered wood heel on this type of shoe, the rear part wrapper strip also covering a portion of the bound platform sole adjacent to the heel. In this case, only the forepart wrapper strip would be omitted.

Figure 23:
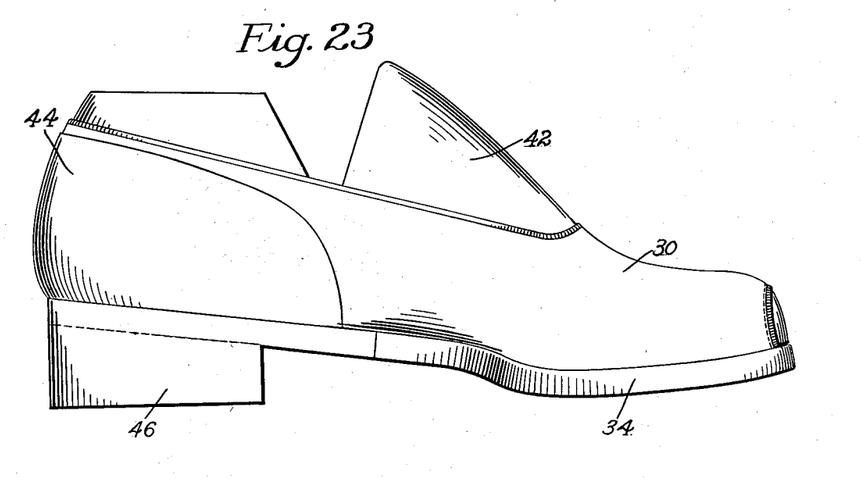
Fig. 23 is a side view of the upper assembly of Fig. 1 on a last with the back part unit of Fig. 20 mounted over its heel portion with the wrapper strips turned and lasted.
Figure 24:
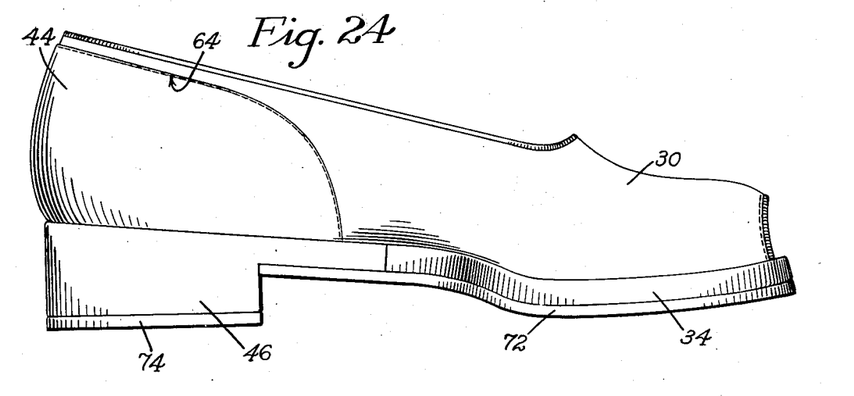
Fig. 24 illustrates the shoe of Fig. 23 after an outsole has been applied, the last removed and the back part unit permanently secured to the upper by stitches extending around the top edge of the quarter.

Figure 23 illustrates the back part unit of Fig. 20 mounted on the heel portion of the slip-lasted upper assembly of Fig. 1 with the wrapper strips 34 and 46 turned downwardly to cover the sides and edge faces of the heel and platform sole and secured to the bottom surfaces of said heel and sole. Fig. 24 illustrates the completed platform shoe after an outsole 72 and a heel lift 74 have been attached to the shoe bottom, the last removed from the shoe and the back part unit secured to the upper by stitches 64, the outsole 72 terminating at the breast of the heel as in the earlier described constructions except the wedge heel construction in which a full length outsole was utilized. In the shoe of Fig. 24, the platform sole 84 will underlie the heel portion of the foot similarly to the wedge heel shoe of Figs. 17 to 19, inclusive, thereby providing a cushion for the foot at the heel portion as well as at the forepart and shank portions. In outward appearance, however, the shoe of Fig. 24 will resemble the shoe of Fig. 16 rather than the wedge heel shoe of Fig. 19, the shoe of Fig. 16, of course, having no platform sole to cushion the foot rearwardly of the breast of the heel. As indicated above, the shoe of Fig. 24 can be made with a precovered or bound platform sole, if desired, rather than with the unbound platform sole 84 illustrated in Fig. 20, in which case the forepart wrapper strip 34 could be omitted and, if the heel 60 of Fig. 20 were a precovered heel, the rear part wrapper strip 46 could also be omitted.

Having thus described our invention, what we claim as new and desire to secure by Letters Patent of the United States is:

1. That improvement in methods of making shoes which comprises securing an upper and a sock lining together off a last, inserting a last into the upper to slip-last the shoe, mounting a back part unit including a stiff molded counter over the heel portion of the upper and securing it thereto, thereby providing the shoe with a stiff heel portion, and attaching shoe bottom members including an outsole to the bottom of the shoe.

2. That improvement in methods of making shoes which comprises securing an upper and a sock lining together off a last, inserting a last into the upper to slip-last the shoe, mounting a stiff back part unit including a premolded and flanged counter over the heel portion of the upper, thereby enclosing said heel portion, removing the last from the shoe, stitching the back part unit to the upper, reinserting the last into the shoe, and attaching one or more shoe bottom members to the bottom of the shoe.

3. That improvement in methods of making shoes which comprises providing a premolded stiff back part unit having an inwardly extending flange, securing an upper to a sock lining off a last, inserting a last into the upper to slip-last the shoe, mounting the back part unit over the outside of the heel portion of the upper and securing it thereto, thereby providing a hard counter portion on the shoe, and completing the shoe by attaching thereto conventional shoe bottom members including an outsole.

4. That improvement in methods of making shoes which comprises stitching an upper having a closed heel portion to a sock lining while off a last, forcing a last into the upper to slip-last the shoe, providing a back part unit consisting of a stiff molded counter, a quarter covering the counter, and a tuck secured to said counter, placing said unit over the heel portion of the upper with cement therebetween, attaching one or more shoe bottom members including an outsole to the bottom of the shoe, and securing the back part unit to the heel portion of the upper.

5. That improvement in methods of making shoes which comprises stitching a sock lining to an upper having a closed heel portion, providing a back part unit consisting of a stiff molded counter having a bottom flange and a heel tuck secured to said flange, mounting said unit over the heel portion of the upper thereby covering said heel portion, attaching one or more shoe bottom members including an outsole to the bottom of the shoe, and permanently securing the back part unit to the heel portion of the upper, thereby providing the shoe with a stiff molded back part or counter portion.

6. That improvement in methods of making shoes which comprises stitching an upper to a sock lining off a last around the entire periphery of said upper, inserting a last into the upper to slip-last the shoe, providing a back part unit consisting of a molded counter, a tuck and a heel, mounting said unit over the heel portion of the upper and securing it thereto, thereby enclosing said heel portion, and applying to the shoe bottom a sole member which abuts the breast of said heel.

7. That improvement in methods of making shoes which comprises stitching together off a last a sock lining and an upper having a closed heel portion, inserting a last into the upper to slip-last the shoe, providing a back part unit consisting of a stiff molded counter with a flange, a quarter covering the outer surface of said counter, a fiber tuck secured to said flange, and a heel secured to the counter and tuck, mounting said back part unit over the heel portion of the upper, permanently securing the unit to said heel portion, and attaching a sole to the shoe bottom.

8. That improvement in methods of making shoes which comprises securing together off a last an upper, a sock lining and a forepart wrapper strip, inserting a last into the upper to slip-last the shoe, providing a back part unit consisting of a molded and flanged counter, a tuck and a rear part wrapper strip, mounting said unit over the heel portion of the upper, thereby providing the shoe with a stiff molded heel portion, applying a platform sole to the shoe bottom, turning the wrapper strips downwardly over the edge face of the platform sole and inwardly under its bottom surface and securing them to said bottom surface, and attaching a sole to the inturned portions of the wrapper strips.

9. That improvement in methods of making shoes which comprises stitching an upper and a forepart wrapper strip to a sock lining, providing a back part unit consisting of a stiff molded counter having a bottom flange, a tuck secured to said flange, and a rear part wrapper strip secured to said counter, mounting said back part unit over the heel portion of the upper thereby covering said heel portion, applying a platform sole to the shoe bottom, turning the wrapper strips downwardly over the edge face of the platform sole and inwardly beneath its bottom surface, securing said wrapper strips to said bottom surface, attaching an outsole to the inturned portions of the wrapper strips, and permanently securing the back part unit to the upper.

10. That improvement in methods of making shoes which comprises providing a back part unit consisting of a molded and flanged counter, a tuck, a rear part wrapper strip and a heel, stitching together off a last an upper, a sock lining and a forepart wrapper strip, inserting a last into the upper to slip-last the shoe, mounting the back part unit on the heel portion of the upper and securing it thereto, laying a platform sole on the shoe bottom forwardly of the heel, turning the wrapper strips downwardly over the edge faces of the platform sole and heel and wiping them inwardly beneath the bottom surfaces thereof, securing said wrapper strips to said bottom surfaces, and attaching an outsole to the portions of the wrapper strips underlying the platform sole.

11. That improvement in methods of making shoes which comprises stitching an upper and a sock lining together off a last, inserting a last into the upper to slip-last the shoe, providing a back part unit consisting of a molded flanged counter covered by a quarter, a tuck, and a heel, mounting said back part unit over the heel portion of the upper with cement therebetween, removing the last from the shoe, stitching the top edge of the quarter to the upper, reinserting the last, and attaching a sole to the bottom of the shoe forwardly of the heel.

12. That improvement in methods of making shoes which consists in securing a rear part wrapper strip to one side of a quarter, securing a counter to the other side of said quarter, molding said members to the heel portion of a last with their lower margins turned inwardly to form a flange, thereby providing a complete back part unit, securing an upper and a sock lining together off a last, inserting a last into the upper to slip-last the shoe, mounting said back part unit over the heel portion of the upper and securing it thereto, delasting the shoe, securing a platform wrapper strip to the forepart of the upper, stitching the back part unit to the upper adjacent to the top edge of said unit, relasting the shoe, applying a platform sole to the shoe bottom, turning the wrapper strips downwardly and inwardly and securing them to the bottom surface of said platform sole, and attaching an outsole to the inturned portions of the wrapper strips.

13. That improvement in methods of making shoes which comprises stitching together an upper, a sock lining and a forepart platform wrapper strip, providing a back part unit consisting of a molded flanged counter covered by a quarter, a rear part wrapper strip, and a heel and fiber tuck secured to the flange of said counter, mounting said back part unit over the heel portion of the upper with cement therebetween, stitching the back part unit to the upper around the top edge of the quarter, applying to the shoe bottom a platform sole which abuts the breast of the heel, turning the wrapper strips downwardly and inwardly over the edges and bottom surfaces of the heel and platform sole and securing them to said bottom surfaces, and attaching an outsole to the shoe bottom.

14. That improvement in methods of making shoes which comprises providing a back part unit consisting of a molded and flanged counter covered on its outer surface with a quarter, a tuck secured to said flange, and a heel secured to the flange and tuck, stitching an upper having a closed heel portion to a sock lining off a last, inserting a last into the upper to slip-last the shoe, mounting said back part unit over the heel portion of the upper with cement therebetween, removing the last and stitching the unit to the upper around the top edge of said unit, reinserting the last, and attaching to the shoe bottom one or more sole members which abut the breast of said heel.

15. That improvement in methods of making shoes which comprises stitching together off a last an upper having a closed heel portion, a sock lining and a forepart platform wrapper strip, inserting a last into the upper to slip-last the shoe, providing a back part unit consisting of a molded and flanged counter covered by a quarter, a rear part wrapper strip secured to said counter, and a tuck secured to the flange of said counter, positioning said back part unit on the heel portion of the upper with cement therebetween, removing the last from the shoe, stitching the back part unit to the upper around the top edge of said unit, reinserting the last, applying a full length platform sole to the shoe bottom, turning the wrapper strips downwardly over the edge face of the platform sole and inwardly beneath its bottom surface and securing said strips thereto, applying a precovered wedge heel to the rear portion of the platform sole, and attaching to the shoe bottom an outsole which extends the full length of the shoe bottom and underlies the platform sole at the forward portion of the shoe and the wedge heel at the rear portion thereof.

16. That improvement in methods of making shoes which comprises stitching together off a last an upper having a closed heel portion, a sock lining and a forepart wrapper strip, inserting a last into the upper to slip-last the shoe, providing a back part unit consisting of a molded and flanged counter covered by a quarter, a rear part wrapper strip secured to said counter, a fiber tuck secured to the inner side of the flange of said counter, a full length platform sole secured to the outer side of said flange, and a heel secured to the platform sole, mounting said back part unit on the heel portion of the upper with cement between said unit and the upper and sock lining, turning the wrapper strips downwardly to cover the edge faces of the heel and platform sole including the breast of the heel, securing said wrapper strips to the bottom surfaces of said heel and platform sole, attaching an outsole to the inturned portions of the wrapper strips which underlie the platform sole, said outsole abutting the breast of the heel, removing the last, and stitching the back part unit to the upper around the top edge of the quarter.

JOSEPH C. LISBON.
HORATIO S. LYNESS.

REFERENCES CITED

The following references are of record in the file of this patent:

UNITED STATES PATENTS

| Number | Name | Date |
|---|---|---|
| 2,126,276 | Page | Aug. 9, 1938 |
| 2,217,274 | Hartwell et al. | Oct. 8, 1940 |
| 2,236,537 | Hyde | Apr. 1, 1941 |
| 2,244,504 | Riddell | June 3, 1941 |
| 2,245,466 | Dawes | June 10, 1941 |
| 2,277,770 | McDonald | Mar. 31, 1942 |
| 2,393,989 | Kamborian | Feb. 5, 1946 |
| 2,404,587 | Maling | July 23, 1946 |
| 2,409,902 | Saval | Oct. 22, 1946 |
| 2,414,104 | Kamborian | Jan. 14, 1947 |
| 2,438,920 | Kamborian | Apr. 6, 1948 |